Nov. 24, 1953

H. G. YETTER 2,660,205

COMBINATION ARBOR AND SUPPORT
FOR POWER-DRIVEN ROTARY TOOLS

Filed Nov. 18, 1948

Harry G. Yetter
INVENTOR.

BY *[signatures]*
Attorneys

Nov. 24, 1953 H. G. YETTER 2,660,205
COMBINATION ARBOR AND SUPPORT
FOR POWER-DRIVEN ROTARY TOOLS
Filed Nov. 18, 1948 5 Sheets-Sheet 2

Harry G. Yetter
INVENTOR.

BY
Attorneys

Nov. 24, 1953
H. G. YETTER
2,660,205
COMBINATION ARBOR AND SUPPORT FOR POWER-DRIVEN ROTARY TOOLS
Filed Nov. 18, 1948
5 Sheets-Sheet 3
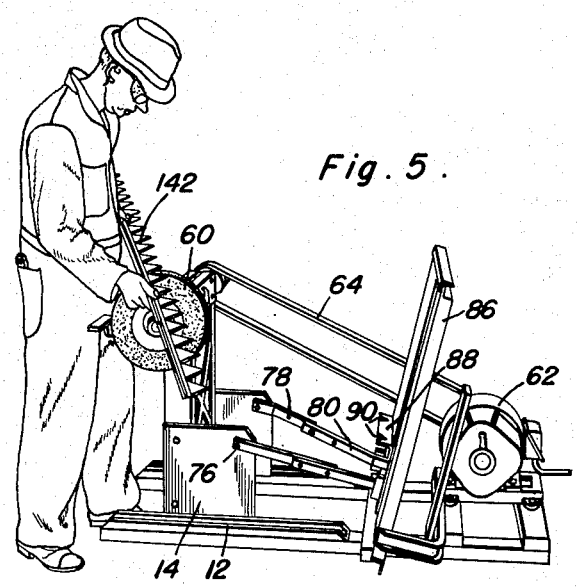
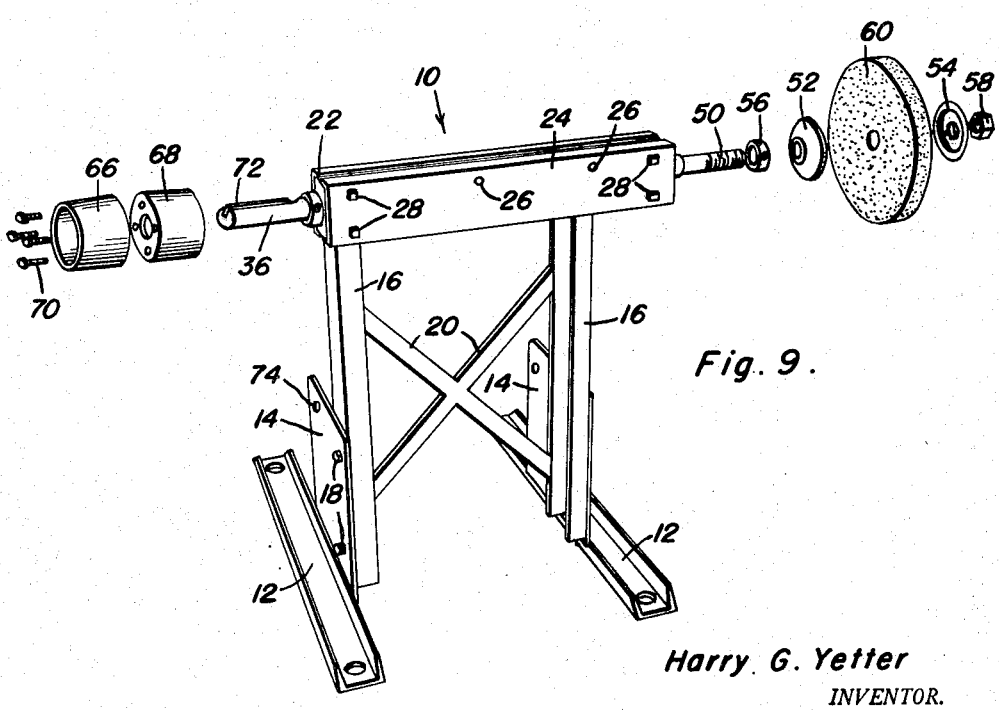
Harry G. Yetter
INVENTOR.
BY *Clarence A. O'Brien*
*and Harvey B. Jacobson*
Attorneys Nov. 24, 1953
H. G. YETTER
2,660,205
COMBINATION ARBOR AND SUPPORT FOR POWER-DRIVEN ROTARY TOOLS
Filed Nov. 18, 1948
5 Sheets-Sheet 4
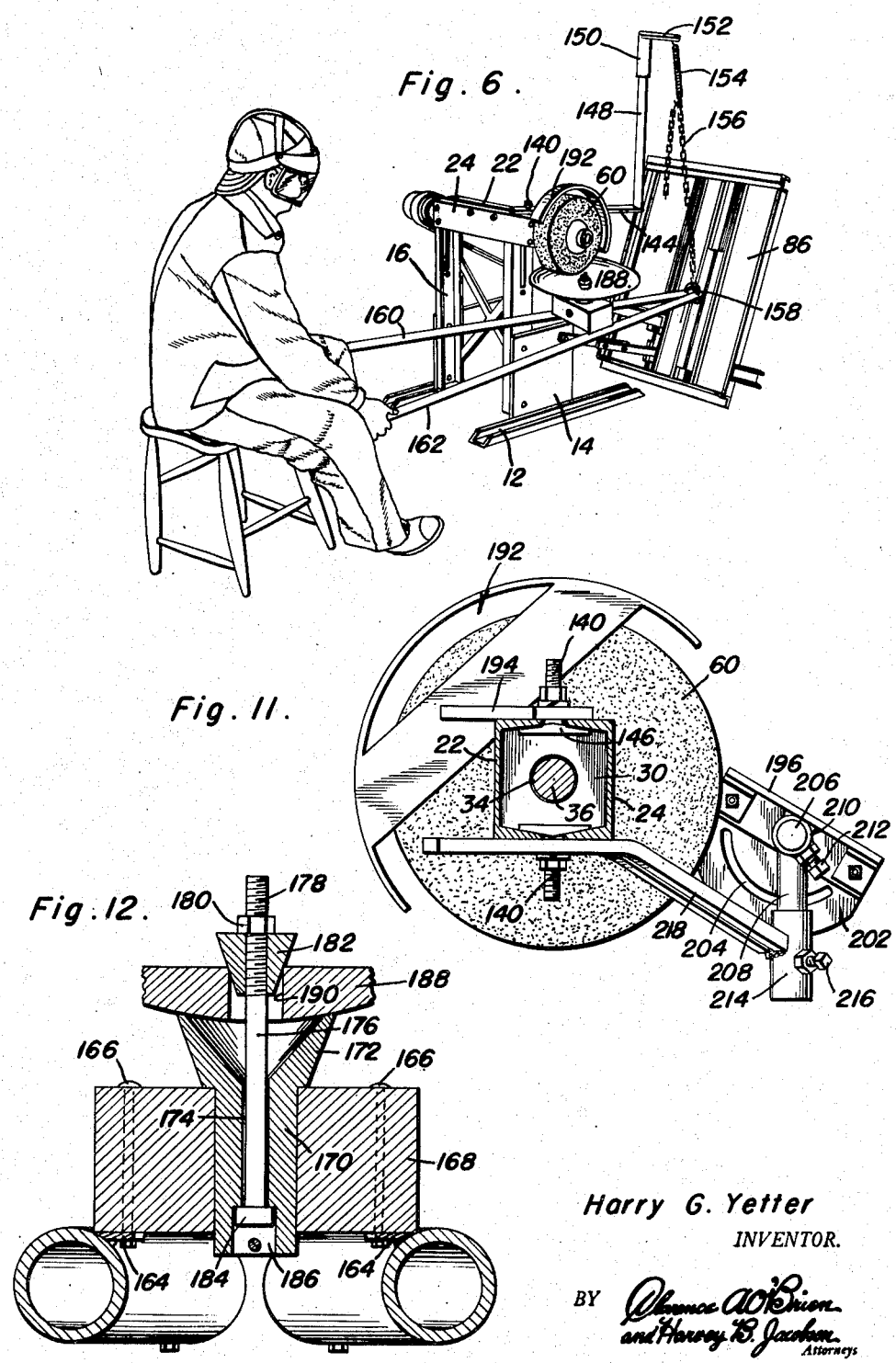
Harry G. Yetter
INVENTOR.

Nov. 24, 1953 H. G. YETTER 2,660,205
COMBINATION ARBOR AND SUPPORT
FOR POWER-DRIVEN ROTARY TOOLS
Filed Nov. 18, 1948 5 Sheets-Sheet 5

Harry G. Yetter
INVENTOR.

BY
Attorneys

Patented Nov. 24, 1953

2,660,205

UNITED STATES PATENT OFFICE 2,660,205

COMBINATION ARBOR AND SUPPORT FOR POWER-DRIVEN ROTARY TOOLS

Harry G. Yetter, Colchester, Ill.

Application November 18, 1948, Serial No. 60,812

8 Claims. (Cl. 143—58)

This invention comprises novel and useful improvements in a combination arbor and more specifically pertains to a universal power tool in which a variety of attachments may be combined with an arbor to perform the functions of various different power tools.

The principal object of this invention is to provide an improved construction of arbor and support frame together with a variety of attachments which may be applied thereto or associated therewith for performing the functions and operations of different forms of power tools.

An important feature of this invention resides in the provision of an improved supporting stand in which is journaled an arbor, together with various novel attachments which may be associated with the support stand and arbor to selectively provide a bench saw, a cordwood saw, various types of tool grinding and sharpening wheels, a blower for a grain elevator, and various guards and guides for the different tools.

The various objects and features of the invention are attainable, in accordance with the principles of the invention, in various suitable manners, preferred embodiments of which have been illustrated by way of example only in the accompanying drawings, wherein:

Figure 5 is a perspective view showing the saw table folded back out of the way, a grinding wheel applied to the arbor and the manner of employing the same to sharpen sickle knives and the like;

Figure 6 is a perspective view similar to Figure 5 but showing a different form of grinder applied to the arbor, with a guard for the grinder mounted upon the arbor support, with a mounting means for positioning a cultivator disc for sharpening by the device;

Figure 9 is an exploded perspective view of the arbor, its support stand, and various component parts thereof in relative positions of application to the device;

Figure 11 is a fragmentary vertical transverse sectional detail view taken substantially upon the plane of the section line 11—11 of Figure 7; and, Figure 12 is a vertical transverse sectional detail view through the means for journaling the cultivator disc for grinding, in the arrangement shown in Figure 6.

Referring now more specifically to the accompanying drawings, wherein like numerals designate similar parts throughout the various views, attention is directed first to Figure 9 for an explanation of the construction of the arbor support stand, and the manner of journaling the arbor therein.

Figure 1:
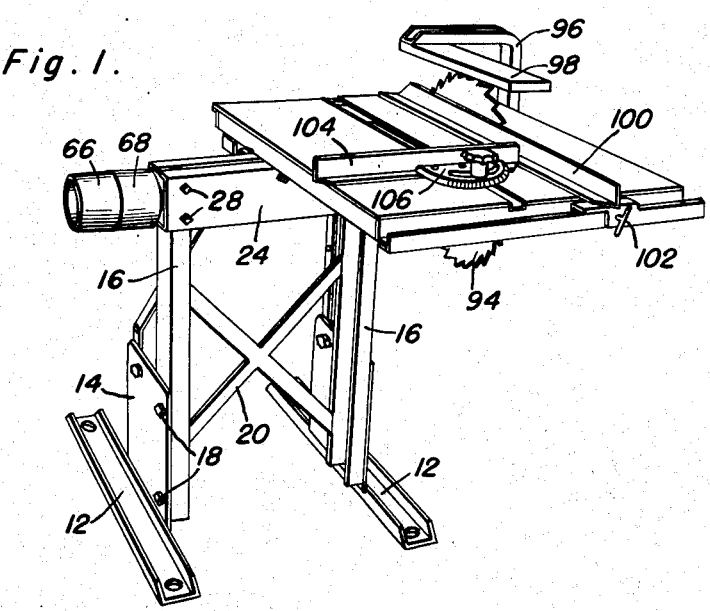
Figure 1 is a perspective view showing the improved arbor having a bench saw and table attached thereto.

The arbor support stand, indicated generally by the numeral 10, is employed without change in all of the various combinations of arbor and tools operated thereby, set forth in the accompanying drawings, and consists of a pair of parallel base plates 12 which may conveniently be of channel iron or similar construction, and upon which are mounted a pair of parallel, vertically disposed flat structural plates 14, to which are secured a pair of standards 16 which likewise may conveniently be of angle iron construction, as by fastening bolts 18. Integrally or rigidly attached to the standard 16 are a pair of crossed brace members 20 which serve to impart rigidity to the supporting framework. The arbor housing itself, is preferably formed with a pair of channel iron members 22 and 24 which are disposed with their legs facing each other, as will be apparent from Figure 11, whereby there is provided a longitudinal slot at the top and bottom of the arbor housing, these members 22 and 24 being clamped together as by fastening bolts 26 and 28, upon a bearing assembly which journals the arbor therein.

It is intended that bolts 26 shall have spacer sleeves thereon to clamp the members 22 and 24 in fixed spaced relation.

Figure 10:
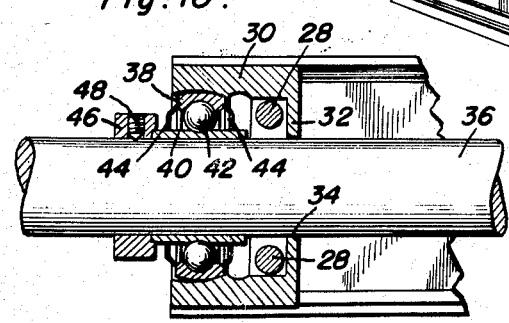
Figure 10 is a fragmentary vertical longitudinal sectional detail view through one of the bearings at which the arbor shaft is journaled.

The bearing assembly, as indicated in Figures 10 and 11, preferably comprises a pair of substantially square bearing blocks 30 which are of hollow construction, being open at one end to receive bearing members therein as set forth hereinafter, and closed at the other end by a partition 32 which is provided with an aperture 34 for receiving a rotatable shaft 36 constituting the arbor shaft of this invention.

The bearing blocks 30 are mounted in the ends of the arbor housing, within the juxtaposed channels of the two channel members 22 and 24, and are rigidly retained in position in the ends of the housing by the above mentioned fastening bolts 28 which extend through suitable bores in the bearing blocks 30. A face bearing assembly consisting of a female bearing race 38 and a male bearing race 40, with a series of ball bearings 42 disposed therebetween, and having bearing cages 44 serving to retain the roller bearings, and constituting shields and dust guards for the bearing races, is detachably secured within the bearing blocks 30 and upon the arbor shaft 36 as by a collar 46 and set screw 48. The male bearing race as will be seen consists of a sleeve which is slidably received upon the arbor shaft 36.

It will thus be seen that the bearing assembly serves both to journal the arbor shaft as well as to assemble the channel members forming the arbor housing. These channel members, being assembled in spaced relation to each other by the bearing blocks and bolts, are also utilized to mount the various accessories as set forth hereinafter.

One end of the arbor shaft 36, extending beyond the arbor housing, is externally threaded as at 50 and is provided with retaining collars 52 and 54, with a fastening collar 56 and with a fastening nut 58, whereby various tools such as a grindstone 60 may be detachably received upon the arbor shaft. At its other extremity, the shaft is provided with a driving pulley by means of which power may be supplied to the arbor from a belt of any suitable power source, such as from the electric motor indicated at 62 in Figure 5, this motor being conveniently mounted upon an extension of the base plates 12, or in any other desired fashion, the driving belt being indicated at 64 in Figure 5.

The driving pulley of the arbor may conveniently consist of a pair of members 66 and 68, retained together as by fastening bolts 70, and keyed to the extension of the arbor shaft 36 on the opposite ends of the threads 50, as by a key 72.

Figure 2:
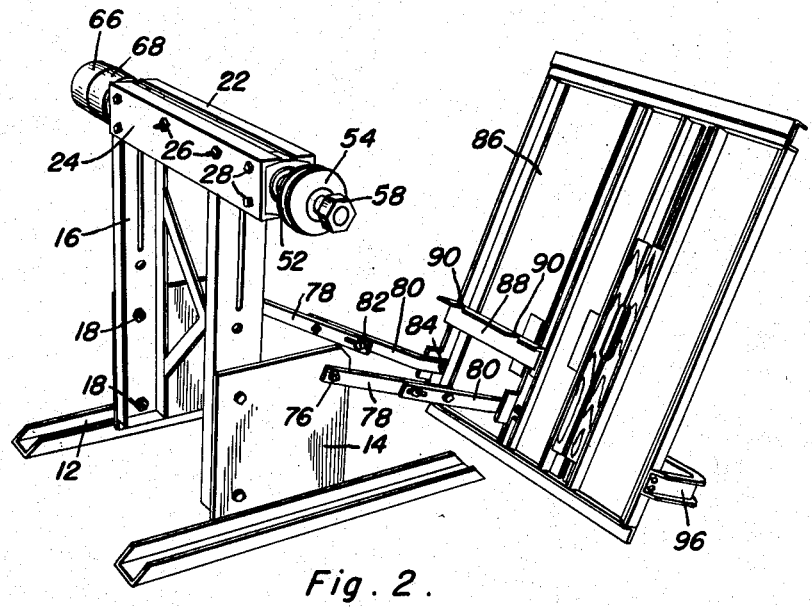
Figure 2 is a perspective view of the arbor and support of Figure 1, with the saw table being shown in its folded back position to give access to the arbor, the bench saw having been removed therefrom.

Attention is now directed to Figures 1 and 2 for an illustration of the manner in which a saw bench may be associated with the arbor to form a power saw. To the apertures 74 of the plates 14, see Figure 9, are pivotally connected as by fastening bolts 76, a pair of lower leg members 78 having upper leg members 80 longitudinally adjustably connected thereto as by elongated slots and bolts indicated generally at 82. By means of the slot and bolts, the overall length of the rigid but longitudinally adjustable leg members 78 and 80 may be adjusted to position the saw bench at any convenient height above the arbor.

At their upper extremities, the legs 80 are pivotally connected as at 84 to a saw bench table 86 which may be of conventional and known design. The under surface of the table may conveniently be provided with a depending flanged member 88, having notches 90 therein, see Figure 5, which notches may be received and retained by the above mentioned fastening bolts 26 of the arbor housing. Thus, the bench or table may be erected or folded to the position shown in Figure 1, with the depending flange 88 received on the same side of the arbor housing from the legs 78 and 80, and with the notches 90 of the flange retained by the fastening bolts 26, whereby the bench table is rigidly mounted upon the arbor stand. Obviously, it is merely necessary to loosen the bolts 26, whereupon the table may be tilted from its assembled position shown in Figure 1 to an inoperative or out-of-the-way position shown in Figures 2, 5 and 6.

As will be further seen from Figure 1, a bench saw 94 may be secured to the arbor by the abovementioned retaining collars 52, 54 and the above described fastening collar 56 and fastening nut 58. The bench itself may have rigidly attached thereto by means of a supporting overhead bracket 96, a saw guard 98, and may have a rib fence 100 adjustably secured to the table as by a clamping device indicated generally at 102, all of conventional design, while a guide 104 may likewise be mounted upon the table at various predetermined angles as by a clamping device 106. Inasmuch as such bench saw tables are well known, any suitable table may be employed with this invention, the particular mounting and fastening means being a feature of this invention.

Figure 3:
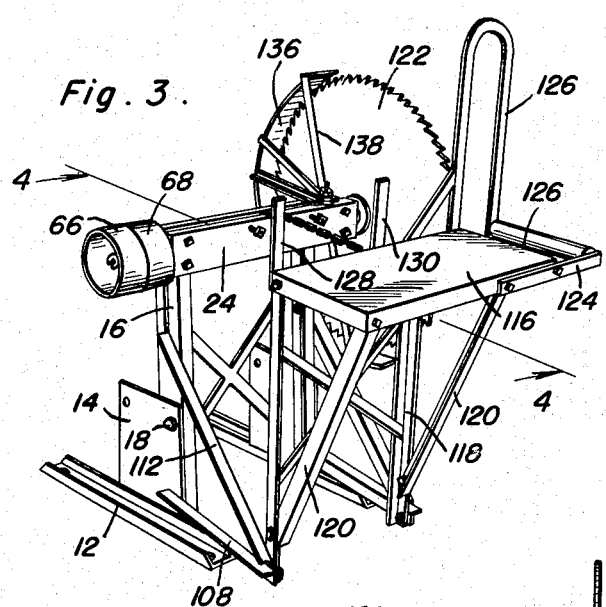
Figure 3 is a perspective view of the device showing a cordwood saw attachment applied to the arbor.
Figure 4:
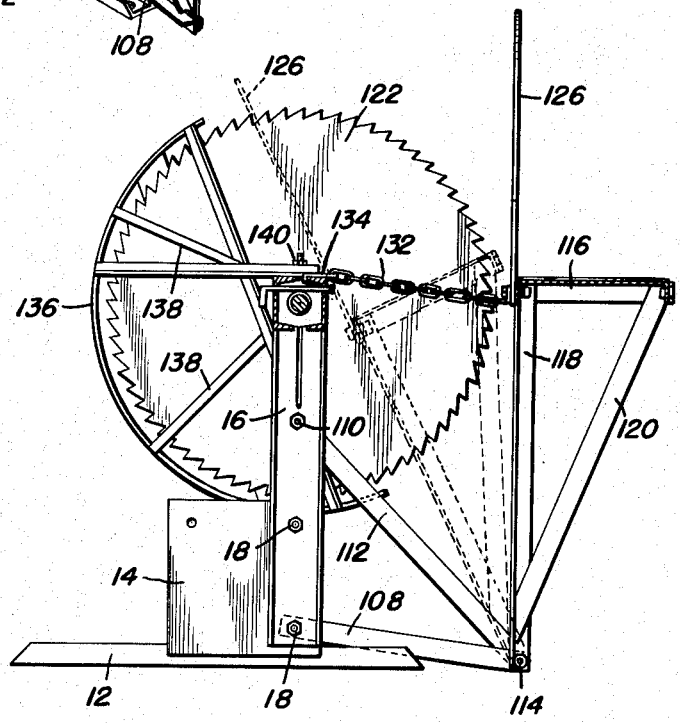
Figure 4 is a vertical transverse section substantially upon the plane of the section line 4—4 of Figure 3.

Attention is next directed to Figures 3 and 4 wherein a cordwood cutting attachment is shown applied to the arbor and support. To apply the cordwood attachment to the device, one of the lower standard fastening bolts 18 is removed from each of the support plates 14, and an angle iron member 108 is terminally secured to the support plates by the said bolt 18, these angle iron members 108 extending longitudinally of the base members 12 as shown. By means of a suitable detachable fastening such as the bolt 110, the end of a frame base member 112 is detachably but rigidly secured to the standard 16 at each side of the frame of the arbor. The lower end of this brace member 112 is secured to the extremity of the member 108 as by a pivot pin or bolt 114, to thus form a triangular and rigid frame extension member. A triangular cordwood saw rocking table including a table or shelf 116 having a pair of rigidly attached side members 118 and 120 at each end thereof, is pivotally mounted upon the triangular extension by means of the pivot pins or bolts 114 thereof extending through the extremities of the members 118, whereby the entire saw table or carriage may be pivoted vertically about the hinge pins 114.

As shown best in Figure 3, the table 116 terminates in spaced relation to the cordwood saw blade 122 which is mounted upon the arbor shaft, and by means of a supporting bracket 124, a guide roll 126 is mounted upon the table 116 in spaced relation thereto, to provide a space therebetween to receive the saw blade 122 when the table is pivoted towards the saw as indicated in dotted lines in Figure 4. A U-shaped brace member 126 is terminally secured to the member 126 and to the table 116, to rigidly attach the other ends of these members, and also provide a clearance for receiving the saw blade 122 when the table is in its tilted position as shown in Figure 4. The inward edge of the table 116 is further provided with a pair of uprights 128 and 130 which together with the brace member 126 serve to position or hold a piece of cordwood upon the table when the latter is pivoted towards the saw blade, whereby the saw passing through the brace 126 and between the table 116 and the member 126, will cut through the piece of cordwood placed upon the table.

As will be apparent from Figure 4, the back or inward side of the table is in a vertical plane above the hinge pin 114 when the saw table is in its released position, whereby the weight of the saw table being disposed outwardly of this pivot will maintain the table in that position. A fastening chain 132 may be suitably attached to the table, and have a hook portion 134 which is receivable in the slot at the top of the arbor housing and between the two arbor channel members 22 and 24, to serve as a stop or abutment to limit the upward movement of the saw table when the latter is moved to its inoperative position.

An arcuate housing 136 is adapted to loosely encircle and surround a considerable portion of the periphery of the saw blade 122 and constitute a guard therefor, this housing being retained as by spokes or brackets 138 and a T-shaped or T-headed fastening bolt 140 which may be identical with the bolt 140 disclosed more clearly in Figure 11, the headed portion of this bolt being slidable longitudinally into the slot between the two channel members 22 and 24, whereby the same may be easily applied to or moved from the arbor housing.

Attention is next directed to Figure 5 for a further use of the invention. In this arrangement, the bench saw table indicated by the numeral 86 is shown in its folded back position to expose the arbor housing, although it will be understood that the cordwood saw table, by merely releasing the chain 132, could likewise be folded back into this out-of-the-way position. A grindstone 60 of any suitable type is mounted upon the threaded end of the arbor shaft, whereby a sickle knife blade 142, a scythe or other similar tool may be applied to the rim of the rotating grinding wheel 60 for sharpening same.

A further use of the invention is illustrated in Figure 6, wherein the bench table 86, or the cordwood table 116 may be folded back out of the way, and the device employed as a sharpener for agricultural harrow discs.

In this arrangement, a support bracket 144 is secured to the top of the arbor housing in a horizontally extending position by means of the T-headed fastening bolts 140. These bolts, as shown in Figure 11, include a screw-threaded shank and an integral oppositely and laterally extending head portion 146 which is received within the open channel members 22 and 24 while the shank of the bolt extends upwardly through the slot between these members, as will be readily apparent from Figure 11. Extending upwardly, and preferably attached to the end of the bracket 144, is a vertically disposed standard 148, upon the upper end of which is telescoped a sleeve 150 having a lateral extending arm 152. The end of this arm 152 in turn supports a spring 154 to which may be fastened a selected length of a supporting chain 156, the end of this chain being secured to a hook 158 on the end of a V-shaped carriage.

This carriage comprises a pair of inclined rod members 160 and 162 which may be welded or otherwise rigidly attached at their convergent ends, and as shown in Figure 12, are provided intermediate their ends with inwardly extending lateral lugs 164 to which are secured as by bolts 166, a transverse block of wood or other suitable material 168. This transverse block thus serves both to add rigidity to the diverging handle assembly, as well as constitutes a support for a bearing member consisting of a tubular bushing 170 having a frusto-conical flared upper end 172 and an axial bore 174. A bolt 176 is slidably received in the bore 174, and has an externally threaded upper end 178 having a fastening nut 180 which retains a frusto-conical collar 182 thereon, while the other end of the bolt has a head 184 which is received in a countersunk portion 186 of the bore of the member 170.

It is intended that a cultivator disc 188 may be mounted upon the bolt 176 by means of the aperture 190 of the cultivator disc, with the disc resting upon the frusto-conical portion 172, and being retained thereon by the conical fastening nut 182 seated in the aperture 190 of the disc. The disc is thus secured to but is rotatably mounted upon the support block 168 carried by the handle assembly. The arrangement is such that as shown in Figure 6, the operator may lift up on the ends of the handles 160 and 162, to thus cause the cultivator disc's rim to be pressed against the lower edge of the periphery of the grindstone 60, and any desired pressure may be applied to the disc to hold the same against the stone by pulling up on the handles, which thus tension the spring 154, resiliently supporting the other end of the handle assembly. It will be observed that as the grindstone 60 rotates upon the edge of the cultivator disc 188, the latter in turn will be gradually rotated upon its supporting bearings 172 and 182, the frusto-conical member 182 serving to center the disc, whereby the entire bevelled edge of the disc may be readily sharpened.

To protect the operator during this operation of the device, an arcuately shaped guard or shield 192 is provided with a supporting bracket 194 which is received and retained upon the top of the arbor housing by one of the T-headed bolts 140 in the manner previously described.

Figure 7:
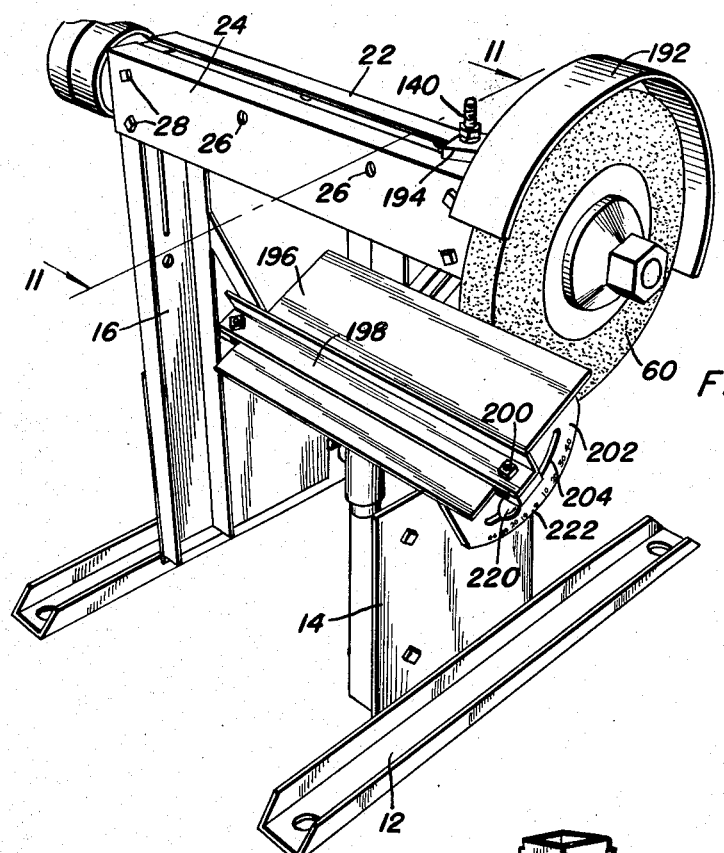
Figure 7 is a perspective view showing a tool guide attachment mounted upon the arbor support for positioning tools at various angles with respect to the grinding wheel of the device.

Attention is next directed to Figure 7 wherein the grinding stone 60 and the guard 192 are employed in conjunction with another accessory for sharpening tools at various predetermined angles or degrees. As shown in Figures 7 and 11, a flat tool supporting plate 196 is provided with an adjustable transversely disposed angle iron stop 198 thereon, adjustably secured as by fastening bolts 200, against which the end of a body of a tool may be rested to cause its blade to be extended over the edge of the support 196 and into engagement with the grindstone 60. Depending from and rigidly attached to the table is a plate 202 having an arcuate slot 204 therein. This table is mounted upon a horizontally disposed pivot 206, disposed intermediately of the underside of the table 196, which pivot is carried by a vertical support shaft 208. By means of a hub portion 210 carried on the undersurface of the table 196 and rigidly attached thereto, and adjusting bolts 212, the table may be vertically inclined at predetermined angular relations with respect to the support post 208 to thereby vary the position of the tool carried by the table with respect to the grinding wheel.

The support post 208 is vertically and slidably received in a tubular boss or sleeve 214, being adjustably retained therein as by a set-screw 216, this sleeve being formed at one terminal of a support bracket 218 whose other extremity is secured to the bottom side of the arbor housing by means of one of the T-headed bolts 140. A combined stop pin and indicator 220 is carried by the standard support plate 14 and rides in the slot 204 to thus limit the arcuate movement of the plate 202 and the support plate 196, as well as cooperate with indicia indicated at 222 upon the plate 202 to indicate in degrees the amount of adjustment of the plate 196.

Figure 8:
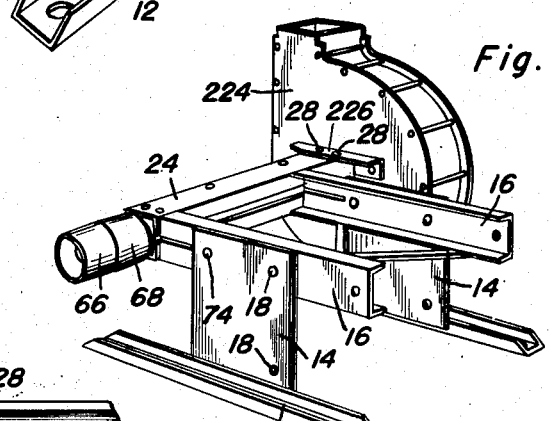
Figure 8 is a perspective view of the arbor showing the casing of a grain blower mounted thereon.

Referring now to Figure 8, it will be seen that a change is made on the support structure to adapt the device to accommodate a grain blower. For this purpose, the lower fastening bolt 18 by which the standard 16 is mounted on the support plate 14 is removed, and the standard 16 with the rigidly attached arbor housing is then pivoted about the upper fastening bolt 18 and the removed bolt is then inserted in the aperture 74 of the plate 14 and through the standard 16 to position the latter in a horizontal plane. It will be noted that in this position the arbor and its housing are mounted in the same horizontal plane as the top of the support plates 14, and hence are lower than in the normal mounting of the arbor as shown in Figure 9. This enables the arbor to be closer to the ground, whereby when a centrifugal blower or pump 224 is mounted by supporting brackets 226 to the end of the arbor housings channel members 22 and 24 by means of the end fastening bolts 28, the grain pump will be sufficiently close to the ground so that grain may be fed into the same from trucks to be blown by suitable conduits to a place of storage or other desired location.

From the foregoing description, it is thought that the numerous advantages and adaptibility of the novel arbor and its support as set forth herein will be readily apparent and further explanation is believed to be unnecessary. However, since numerous changes and equivalents will readily occur to those skilled in the art after a consideration of the foregoing specification and accompanying drawings, it is not desired to limit the invention except in accordance with the appended claims.

Having thus disclosed and described the invention, what is claimed as new is as follows:

1. A combination arbor comprising a support, an arbor housing mounted on said support, said housing comprising a pair of horizontally disposed channel members opening towards each other, means connecting said channels in spaced relation to provide a pair of attachment receiving slots disposed on opposite sides of the housing, bearings supported by said connecting means, and an arbor journaled in said bearings, said support including a pair of spaced base members, an upstanding rectangular plate secured to each of said base members, each plate having a first hole adjacent an upper corner thereof, a second hole spaced from said first hole along a horizontal line, a third hole spaced from the first hole along a vertical line, said second and third holes being spaced equal distances from said first hole, and standards carrying said arbor housing and secured to said plates by bolts passing through said first holes and one of the other holes, whereby the standards may be either vertically or horizontally mounted on said plates.

2. The combination of claim 1 including a saw blade on said arbor, a saw table having an opening for receiving said saw blade, legs rigidly secured to said table and pivoted to said support for pivotal movement of said table towards and from said saw, and a chain fastened to said table and engageable in one of said slots for limiting movement of said table away from said saw blade.

3. The combination of claim 1 including a bracket, a T-headed fastener received in said housing and extending through the slot in the lower surface thereof for securing said bracket, a vertically adjustable post carried by said bracket, a horizontal pivot on said post, a tool support table vertically movable on said pivot.

4. The combination of claim 3 including a rotatable member secured to one end of said arbor, an arcuate guard for said rotatable member, a support bracket for said guard, and a T-headed fastener seated in said arbor housing and extending through one of said slots for fastening said bracket to said housing.

5. The combination of claim 1 including a supporting carriage, means resiliently mounting one end of said carriage on said housing, a grinding wheel on said arbor and means for rotatably journaling a cultivator disc on said carriage with the disc in a plane perpendicular to the plane of the grinding wheel.

6. The combination of claim 5 wherein said means includes a support block on said carriage having a bushing therein, an annular bearing surface on said bushing for supporting a disc, a bolt movable in said bushing and extending through a disc and a frusto-conical self aligning bearing on said bolt and extending into an axial hole of said disc.

7. A combination arbor comprising an upright support, an arbor housing mounted on said support, said housing comprising a pair of horizontally disposed channel members opening towards each other, means connecting said channels in spaced relation to provide a pair of attachment receiving slots disposed on upper and lower sides of the housing, bearings supported by said connecting means, and an arbor journaled in said bearings, a saw blade on said arbor, a saw table top having a slot receiving said blade, a pair of brace members connected terminally to said table top and to the lower part of said support, and a depending flange on said table top spaced from said brace members engaged in the upper one of said slots in the housing and securing said table top to said housing.

8. The combination arbor of claim 7, wherein said connecting means include a plurality of square blocks fitting between the flanges of said channel member and engaging the webs thereof, and a plurality of bolts passing through said webs and blocks to secure the channels together, said blocks being hollow and having said bearings disposed therewithin.

HARRY G. YETTER.

References Cited in the file of this patent

UNITED STATES PATENTS

| Number | Name | Date |
|---|---|---|
| 453,221 | Taylor | June 2, 1891 |
| 933,965 | Endres | Sept. 14, 1909 |
| 1,040,233 | Meier | Oct. 1, 1912 |
| 1,187,755 | McArthur | June 20, 1916 |
| 1,188,949 | Koehler | June 27, 1916 |
| 1,337,352 | Gardner | Apr. 20, 1920 |
| 1,343,342 | Bray | June 15, 1920 |
| 1,365,536 | Nielsen | Jan. 11, 1921 |
| 1,452,508 | Hervig | Apr. 24, 1923 |
| 1,466,573 | Alexander | Aug. 28, 1923 |
| 1,622,237 | Kennedy | Mar. 22, 1927 |
| 1,669,941 | Kennedy | May 15, 1928 |
| 1,793,392 | Francyk | Feb. 17, 1931 |
| 1,864,376 | Russell | June 21, 1932 |
| 2,088,442 | Sanchez | July 27, 1937 |